May 21, 1968  L. WIEMANN ET AL  3,384,383
SPRING RING FOR OIL STRIPPING PISTON RINGS
Filed April 30, 1965

Inventors
Lothar WIEMANN &
Werner ENGEL

United States Patent Office 3,384,383
Patented May 21, 1968

3,384,383
SPRING RING FOR OIL STRIPPING PISTON RINGS
Lother Wiemann, Burscheid, and Werner Engel, Opladen, Germany, assignors to Goetzewerke Friedrich Goetze Aktiengesellschaft, Dusseldorf, Germany
Filed Apr. 30, 1965, Ser. No. 452,157
Claims priority, application Germany, Aug. 25, 1964,
G 41,385
2 Claims. (Cl. 277—140)

ABSTRACT OF THE DISCLOSURE

A spring member for urging oil stripping rings in the radially outward and the axial direction of a piston groove in which they are mounted, in which the spring member comprises an undulating bend having radially outwardly extending projections from the inner bends engaging the inner faces of the stripping rings to urge them axially away from each other, while the spring member has radially inwardly extending projections on the outer bends with lugs on the inner ends thereof that engage the inner periphery of the stripping rings and urge them radially outwardly in the groove, said spring member being tangentially, radially and axially resilient.

---

This invention relates to springs of the type which are tangentially and radially resilient and which are used with piston rings of the oil regulating type.

One of the prior art types of piston rings of the type used for stripping oil from the cylinders of internal combustion engines consists of thin piston rings which are positioned in a groove on the piston and are supported in the radial and axial directions by a spring member which is resilient in both tangential and radial directions.

The spring member is of the type which has a plurality of reverse bends therein to form an undulating circular member.

In the above known arrangements, the spring member extends towards the bottom of the groove and is provided with lugs which engage the inner peripheries of the band-like rings to urge the rings radially outwardly against the cylinder wall.

In order to enable the spring member to exert a radial force on the rings urging them against the cylinder wall, it was necessary for the piston rings to have a width which was about equal to the depth of the groove on the piston. Piston rings of such width do not have sufficient elasticity to fit snugly against the cylinder wall.

This invention involves a spring member which exerts a sufficiently strong force on the piston rings and which can be used with piston rings which are narrow in the radial direction. The spring member which has a plurality of reverse bends consisting of inner and outer bends to form a circular member has lugs projecting from the outer bends thereof which engage the inner peripheries of the rings for tensioning the rings radially outwardly. These projecting lugs can be made to various lengths to accommodate piston rings of different widths.

The spring member also has projections or fins extending outwardly from the inner bends thereof to urge the rings against the opposed walls or flanks of the groove on the piston.

Accordingly, an object of this invention is to provide an improved spring member for supporting piston rings of the oil regulating type.

Another object of this invention is to provide an improved spring member of the type which is tangentially and radially resilient which can be readily adapted to oil regulating piston rings of varying width.

Another object of this invention is to provide a spring member of the above type which is especially adaptable for use with narrow width oil-regulating piston rings.

These and other objects and advantages will become more apparent upon reading the following description and drawings, in which.

Figure 1:
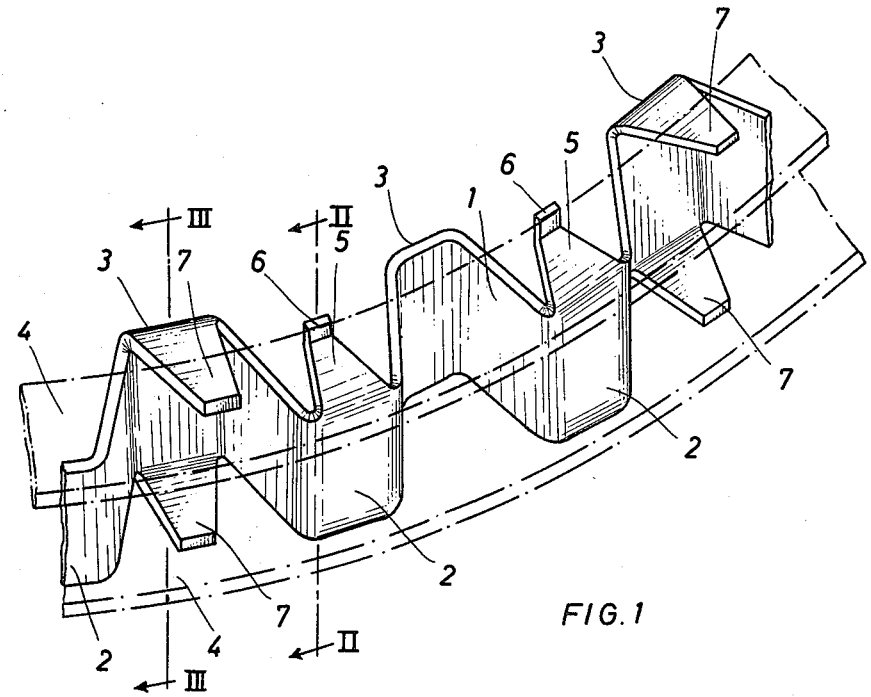
FIGURE 1 is a plan view of a section of the tension spring with a portion of the piston ring shown in phantom outline.

Referring to the drawings in more detail, FIGURE 1 shows a plan view of the spring member generally designated 1. The spring member has a plurality of reverse bends therein as shown to form a circular member which is undulating or sinusoidally shaped.

The reverse bends consist of outer bends 2 which are integrally joined to the inner ends 3 as shown.

From opposed sides of the outer bends 2, there are projecting members or stirrups 5 which extend inwardly towards the groove of the piston 8 in which the spring is installed. The projecting members 5 have lugs 6 on the ends thereof as shown in FIGURE 2 and these lugs urge the piston rings 4 radially outwardly of the piston groove towards the cylinder wall 9 shown in phantom outline.

A special feature of this invention is that the projecting members 5 can easily be made in different lengths to accommodate piston rings of various widths. The lugs 6 engage the inner peripheries of the piston rings 4 as shown in FIGURE 2.

Figures 2, 3:
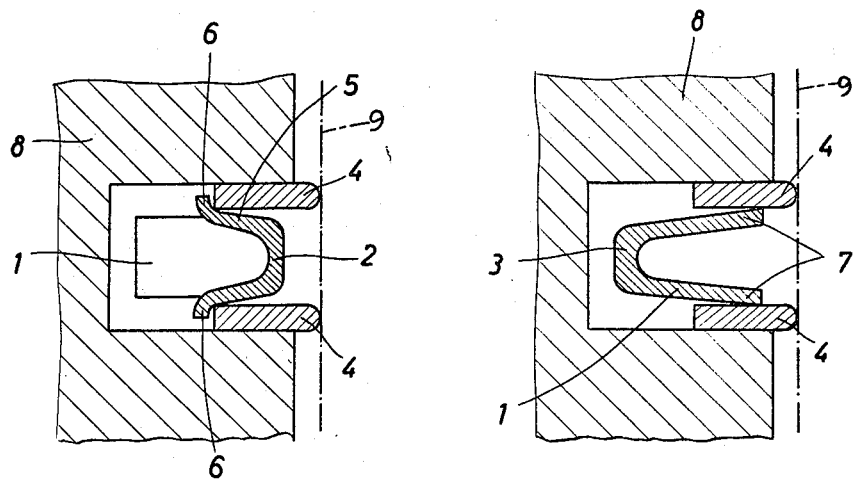
FIGURE 2 is a cross section through a piston seal, taken on the line 2—2 of FIGURE 1.
FIGURE 3 is a similar cross section taken on the line 3—3 of FIGURE 1.

The spring member of this invention is also provided with other projecting members or fins 7 which are shown in FIGURES 1 and 3. These projections 7 are integrally joined to opposed sides of the inner bends 3 and extend in a direction outwardly of the piston groove to urge the rings 4 against the opposed walls or flanks of the piston groove. The lugs 6 also assist in urging the rings against the opposed walls.

The projections 7 may be positioned at intervals along the bends as shown in FIGURE 1 to simplify the construction as it is not necessary to support the rings 4 with projections from every inner bend 3. The outermost extensions of fins 7 resiliently urge the piston rings against the pertaining wall of the opposed walls and help maintain the rings in the position shown in FIGURE 3 when the piston reciprocates in the cylinder.

It will be understood that this invention is susceptible to modification in order to adapt it to different usages and conditions; and accordingly, it is desired to comprehend such modifications within this invention as may fall within the scope of the appended claims.

What is claimed is:

1. A piston ring assembly including a spring member having a plurality of reverse bends therein to form an undulating circular member supporting band-like oil stripping rings in an annular peripheral groove in a piston, said groove having axially spaced opposed walls against which said rings abut, said oil stripping rings being relatively thin radially so as to be flexible enough to conform to the walls of a cylinder in which the piston is mounted while said spring member in radial extent is only slightly less than the radial extent of the groove in the piston so the spring member has a high degree of resilience, said bends in said spring member comprising inner and outer bends which extend along radial lines when formed into said circular member, at least some of said outer bends having first tongue-like projections extending radially inwardly from opposed sides thereof, axially outwardly extending lug members on the inner ends of said first projections, said first projections extending radially inwardly about half the radial extent of said spring member, said lug members engaging the radially inner edges of said rings and urging said rings radially outwardly of said groove along radial lines, said spring member also comprising second tongue-like projections extending radially outwardly from opposed sides of at least some of said inner bends and terminating radially inwardly of the radially outer peripheries of said rings and engaging the axially inner sides of said rings and urging the rings in respectively opposite axial directions against said opposed walls of said groove, the said second projections extending substantially the full radial extent of said spring member.

2. A piston ring assembly according to claim 1, in which said first projections diverge in the radially inward direction of said spring member while said second projections diverge in the radially outward direction of said spring member, said second projections engaging said rings just inwardly from the outer limit of said piston.

References Cited

UNITED STATES PATENTS

| | | | |
|---|---|---|---|
| 2,833,605 | 5/1958 | Shirk | 277—140 |
| 3,081,100 | 3/1963 | Nisper | 277—140 |
| 3,081,101 | 3/1963 | Marien | 277—140 |
| 3,138,391 | 6/1964 | Charlesworth | 277—140 |
| 3,181,875 | 5/1965 | Shepard | 277—140 |

LAVERNE D. GEIGER, *Primary Examiner.*

J. S. MEDNICK, *Assistant Examiner.*